United States Patent
Maxwell et al.

(10) Patent No.: US 6,550,267 B2
(45) Date of Patent: Apr. 22, 2003

(54) CARCASS CHILLING PROCESS AND APPARATUS

(75) Inventors: Gordon R. Maxwell, Brandon (CA); Ross H. Maxwell, Brandon (CA); Andrew M. Butler, Brandon (CA); George J. Chamberlain, Brandon (CA)

(73) Assignee: Maple Leaf Foods Inc., Brandon (CA)

( * ) Notice: Subject to any disclaimer, the term of this patent is extended or adjusted under 35 U.S.C. 154(b) by 0 days.

(21) Appl. No.: 09/940,074

(22) Filed: Aug. 27, 2001

(65) Prior Publication Data

US 2003/0037563 A1 Feb. 27, 2003

(Under 37 CFR 1.47)

(30) Foreign Application Priority Data

Aug. 25, 2001 (CA) .............................................. 2355173

(51) Int. Cl.$^7$ .............................................. F25D 17/02
(52) U.S. Cl. ...................................................... 62/375
(58) Field of Search ............................... 62/63, 64, 74, 62/337, 345, 441, 374, 375

(56) References Cited

U.S. PATENT DOCUMENTS

| 4,028,774 A | 6/1977 | Allan et al |
| 4,325,221 A | 4/1982 | Grewar |
| 4,810,515 A | 3/1989 | Bourdel |
| 4,940,599 A | 7/1990 | Engler et al. |
| 2002/0139126 A1 | 10/2002 | Butler |

*Primary Examiner*—William C. Doerrler
*Assistant Examiner*—Malik N. Drake
(74) *Attorney, Agent, or Firm*—Woodling, Krost & Rust

(57) ABSTRACT

A method for chilling an animal carcass comprises spraying the outer surface of the carcass with a liquid, preferably water, which will freeze on the outer surface of the carcass to form a solid shell to prevent moisture loss from the carcass. Preferably, the liquid is sprayed onto the outer surfaces of the carcass at a critical point in the chilling process at which the outer surface of the carcass reaches a temperature close to the freezing point of the liquid. The liquid is preferably sprayed onto the carcass within a spray cabinet which is preferably positioned along a conveyor line in a refrigeration chamber through which the carcass is conveyed. The spray cabinet comprises heated side walls which maintain a temperature inside the cabinet greater than the freezing point of the liquid, which is sprayed onto the carcass by a plurality of nozzles located within the spray cabinet.

15 Claims, 3 Drawing Sheets

CARCASS CHILLING PROCESS AND APPARATUS

FIELD OF THE INVENTION

This invention relates generally to processing of carcasses and more particularly to a method and apparatus for rapid chilling of carcasses to prevent deterioration thereof.

BACKGROUND OF THE INVENTION

Following the slaughter of animals for meat, it is necessary to immediately chill the carcasses of the freshly killed animals from the kill temperature to a temperature at which deterioration of the meat is substantially prevented.

One problem encountered during the chilling process is a loss of moisture from the carcasses. As well as causing undesirable condensation on the walls and ceiling of the chill room, moisture loss results in a significant reduction in the end weight of the carcass, up to about three percent, and a corresponding reduction in profit. Loss of moisture also negatively impacts the quality of the end product, particularly in the appearance of the outer portions of the carcass from which most of the moisture is lost.

The problem of moisture loss has been addressed by subjecting the carcasses to rapid chilling by super-cooled, high velocity air. This type of rapid chilling process is known in the art as "quick chill" or "blast chill". One method of conducting a quick chill process is described in U.S. Pat. No. 4,028,774 (Allan et al.) issued Jun. 14, 1977, in which chilling is conducted by passing a carcass through a specially designed enclosure in which refrigerated air is blown over the carcass. As described in the Allen et al. patent, rapid chilling causes the formation of a thin frozen crust on the outer surface of the carcass, thus preventing deterioration of the inner portions of the carcass as it is cooled, and also reducing the moisture loss from the carcass to a relatively low level.

The rapid chilling of carcasses as described in the Allen et al. process typically reduces moisture loss to about one percent by weight, representing a substantial improvement over previously used chilling processes. However, even at this reduced level of moisture loss, there is significant degradation of meat color and quality. Therefore, it is desirable to reduce moisture loss during chilling of carcasses to the lowest possible level in order to maximize profitability and quality of the end product.

Several other methods have been developed to deal with this problem, none of which have proved to be completely satisfactory.

U.S. Pat. No. 4,325,221 (Grewar) issued Apr. 20, 1982, discloses a method of freezing the outermost layer of flesh on a carcass by contacting the carcass with a cryogenic liquid such as liquid nitrogen or liquid carbon dioxide, followed by cooling the carcass throughout by placing it in a mechanically refrigerated cold room under non-thawing conditions. As in the method described by Allan et al., the Grewar method forms a thin frozen crust on the outer surface of the carcass, and would be expected to achieve a similar level of reduction in the degree of moisture loss.

U.S. Pat. No. 4,810,515 (Bourdel) issued Mar. 7, 1989, discloses a method of cooling carcasses in which the carcasses are moved on a conveyor through a chill room. As the carcasses are cooled, they pass through a series of high humidity chambers such that the outer surface of each carcass is periodically enveloped in a water saturated atmosphere, thereby preventing excess moisture loss from the carcass. The Bourdel process however tends to be fairly expensive due to the number of high humidity chambers which must be installed inside the chill room.

U.S. Pat. No. 4,940,599 (Engler et al.) discloses a quick chill process in which carcasses are rapidly chilled by being subjected to a super-cooled atmosphere for a brief period of time. Either before or after the quick chilling of the carcasses, they are sprayed with a fine mist of water, thereby forming a thin ice layer on the outer surface of the carcasses.

It is known that where carcasses are washed with water immediately prior to the rapid chilling stage as taught by Engler et al., a thin layer of ice is formed on the outer surfaces of the carcasses. However, the layer of ice formed by this method cannot be controlled with regard to thickness, uniformity or consistency. In fact, the inventors have found that much of the water sprayed onto the carcass will either run off or be blown off by the force of the circulating air before it can form an ice layer. Thus, the formation of this type of ice layer on a carcass has a limited effect on moisture loss and improvement of meat quality. In fact, the inventors have found that a moisture loss of about 1.4 percent is typical with this type of process.

Furthermore, the inventors have found that there is little benefit to spraying carcasses with water after the quick chill process as disclosed in the Engler et al. patent, since much of the moisture loss will already have occurred before the ice layer is formed.

Therefore, there is a continued need for a chilling process which will further reduce moisture loss from carcasses.

SUMMARY OF THE INVENTION

The present invention overcomes the above-described problems of the prior art by providing a method for chilling a carcass in which the carcass is sprayed with a liquid during the chilling process. Preferably, the liquid is sprayed onto the carcass at a point in the chilling process where the outer surface of the carcass is at or near the freezing point of the liquid, resulting in the rapid formation of a uniform layer of frozen liquid on the outer surface of the carcass, which substantially prevents escape of moisture from the carcass and preserves the quality of the end product.

In preferred embodiments of the invention, the liquid sprayed onto the surface of the carcass is water, which freezes to form a layer of ice on the carcass.

By spraying the carcass at the critical point where its temperature is at or near the freezing point of the liquid, the inventors have substantially overcome the problems of the prior art discussed above, and in particular the problems of the Engler et al. patent in which an ice layer is formed on the carcass either too early or too late in the cooling process to effectively prevent moisture loss. The process of the present invention is capable of virtually eliminating moisture loss and preserving the appearance and quality of the end product.

Preferably, the carcass is sprayed inside a specially designed spray cabinet positioned within a chill room through which the carcass is transported by suspension from an overhead conveyor. The spray cabinet walls contain a plurality of water pipes, each of which is provided with a plurality of spray nozzles to direct water at the carcass. The walls of the cabinet are heated to prevent freezing of the water inside the pipes, which would otherwise occur since the chill room is maintained at a temperature well below the freezing point of water.

BRIEF DESCRIPTION OF THE DRAWINGS

The invention will now be described, by way of example only, with reference to the accompanying drawings, in which.

DETAILED DESCRIPTION OF PREFERRED EMBODIMENTS

Figure 1:
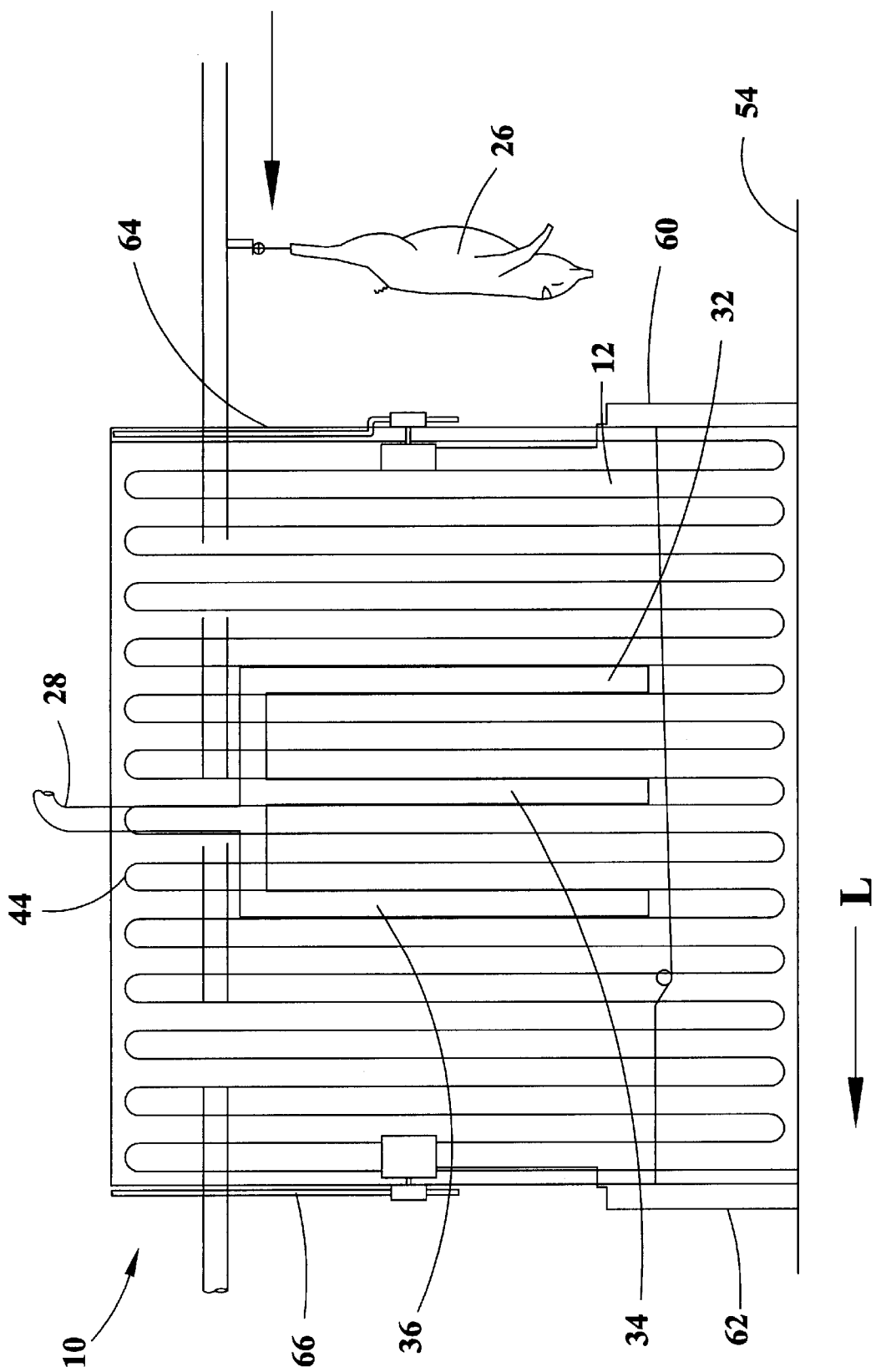
FIG. 1 is a side elevational view of a preferred spray cabinet according to the present invention.

A preferred method and apparatus for chilling carcasses is now described below with reference to the drawings. Although the preferred method and apparatus are described with reference to the chilling of a hog carcass 26, it will be appreciated that the method and apparatus of the present invention can be applied to a variety of other species, including beef, sheep and poultry, with little difficulty. Furthermore, the apparatus according to the invention can be adapted so as to be suitable for use with a number of species.

As shown in the drawings, hog carcass 26 is preferably cut open prior to chilling to expose an interior body cavity thereof. As used herein, the term "outer surface" of the carcass 26 refers to those surfaces, including the surfaces of the interior cavity, which are in direct contact with chilled air in the refrigeration chamber. The term "interior" as used herein with reference to carcass 26 refers to those portions of the carcass 26 which are enclosed by the outer surface and which are not in direct contact with chilled air in the refrigeration chamber.

The preferred apparatus according to the invention comprises a spray cabinet 10 having a pair of substantially vertical sidewalls 12 and 14 extending along a longitudinal axis L. As illustrated in the drawings, sidewall 12 has respective inner and outer surfaces 16 and 18 and sidewall 14 has respective inner and outer surfaces 20 and 22.

The inner surfaces 16 and 20 of sidewalls 12 and 14 are spaced from one another so as to define an elongate interior chamber 24 having a length along the longitudinal axis substantially the same as the lengths of sidewalls 12 and 14, and having a width measured between the inner surfaces 16 and 20 which is slightly greater than the width of hog carcass 26 so as to closely enclose the carcass 26. The interior chamber 24 also has a height which is greater than the length of the carcass.

The spray cabinet 10 further comprises water supply means in the form of a cold water pipe 28 extending from a cold water supply (not shown) to the spray cabinet 10. The cold water 28 pipe may preferably be wrapped with insulation in order to prevent freezing of the water flowing therethrough before it reaches the spray cabinet.

The spray cabinet 10 further comprises spray means which are in communication with the water pipe 28, the spray means preferably comprising a plurality of nozzles 30 formed in a plurality of branch pipes which receive water from the water pipe 28. In the preferred cabinet 10 shown in the drawings, a first plurality of branch pipes 32, 34 and 36 extend vertically and in spaced relation to one another along the inner surface 16 of sidewall 12, and a second plurality of branch pipes 38, 40 and 42 extend vertically and in spaced relation to one another along the inner surface 20 of sidewall 14. As shown in the drawings, the branch pipes each have an upper end which is connected to the water supply pipe 28 and a lower end in the bottom of the interior chamber 24. The nozzles 30 are positioned on the branch pipes and directed so as to ensure that water sprayed by the nozzles contacts substantially the entire outer surface of the carcass 26 as it passes through the spray cabinet 10. Specifically, the nozzles 30 are preferably regularly spaced along each branch pipe with an uppermost nozzle 30 being located proximate the top of the chamber 24 and the lowermost nozzle 30 being positioned proximate the lower end of the branch pipe proximate the bottom of the interior chamber 24.

The spray cabinet 10 is also provided with heating means, preferably electrical resistance heating means, in the form of heat traces 44, which maintain the sidewalls 12 and 14 and the interior of cabinet 10 at a temperature above the freezing point of water, so as to prevent freezing of water within the branch pipes.

Figure 3:
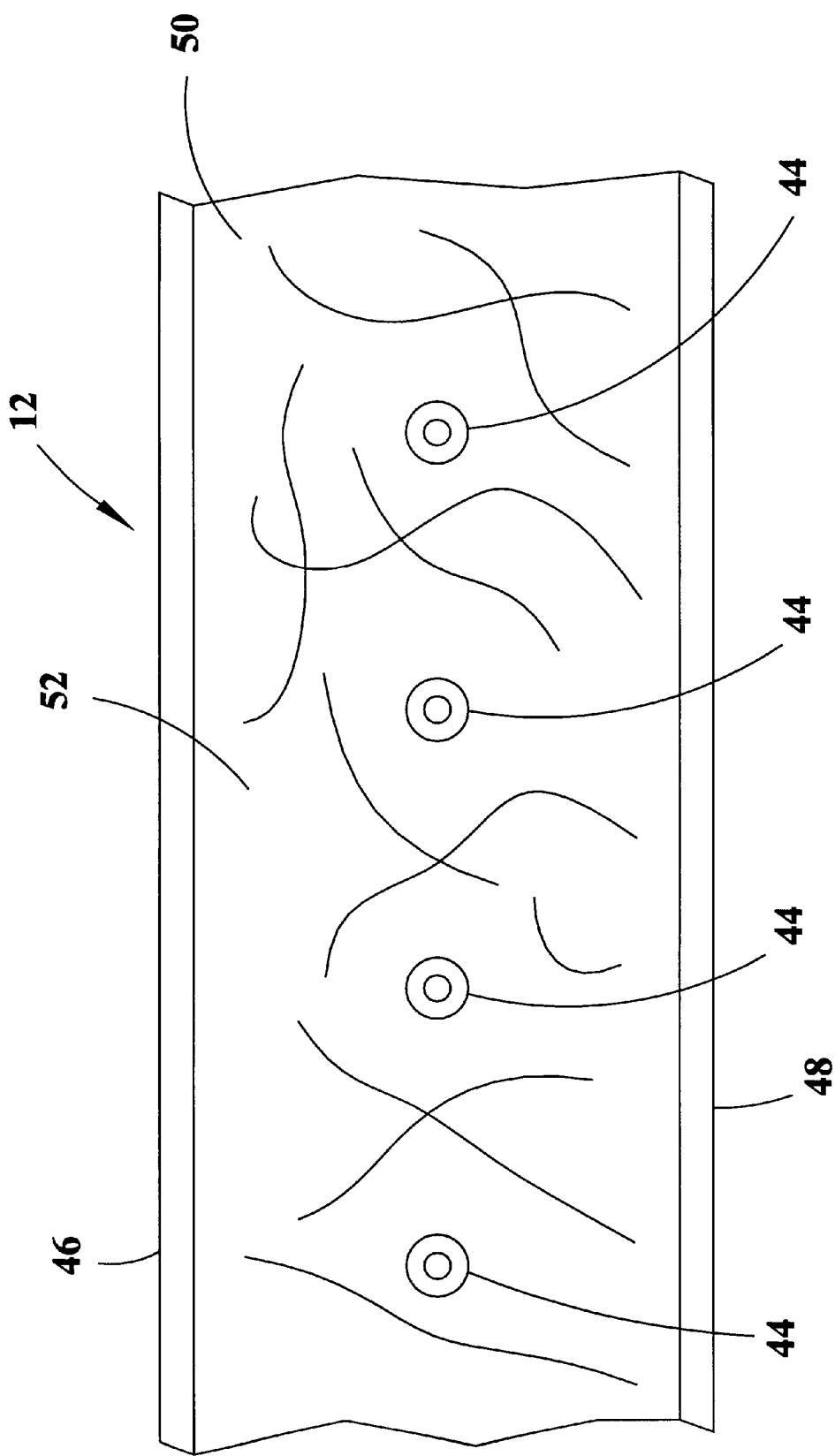
FIG. 3 is a cross-sectional view through one of the side walls of the spray cabinet.

Preferably, each of the sidewalls 12 and 14 of the spray cabinet comprises a pair of panels spaced from one another to define an interior panel space. FIG. 3 is a cross-sectional view of sidewall 12 showing that sidewall 12 comprises a pair of panels 46 and 48, preferably comprised of stainless steel, which enclose an interior panel space 50 provided with an insulating material 52. As shown in this drawing, heat traces 44 comprise insulated electrical resistance heating means which are positioned within the insulating material 52.

Figure 2:
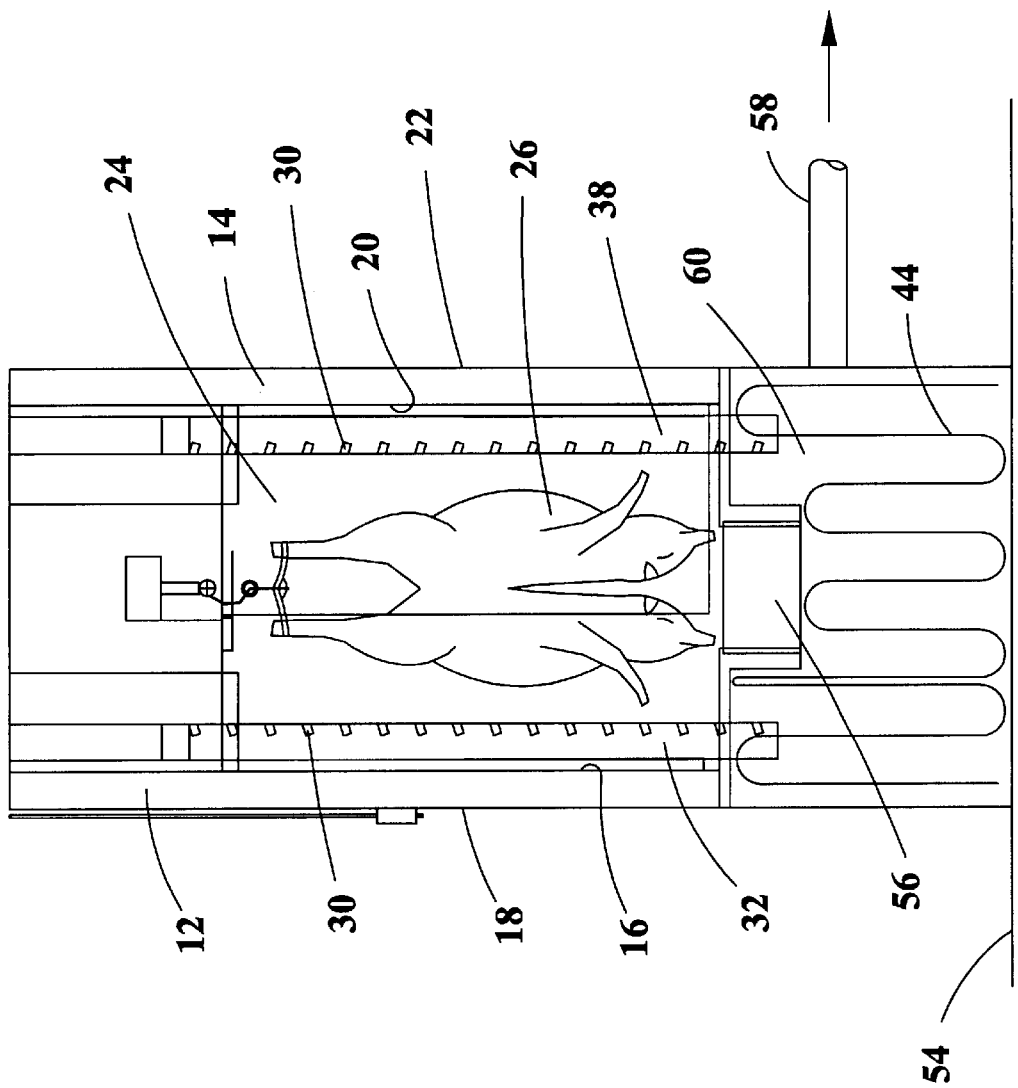
FIG. 2 is a front elevational view of the spray cabinet of FIG. 1.

As best shown in the end view of FIG. 2, the bottom of the interior chamber 24 is elevated above the floor level 54 and is proximate to the lower end of carcass 26. The bottom of the interior chamber 24 is provided with water drainage means in the form of a drainage trough 56 which is preferably elongate and extends along the longitudinal axis L. The water is drained from trough 56 to a drainage pipe 58 which removes excess water from the spray cabinet 10. The heat traces 44 extending into the lower portions of sidewalls 12 and 14 assist in preventing freezing of the water draining into trough 56.

As illustrated in the drawings, the spray cabinet 10 is preferably also provided with a front wall 60 through which the hog carcasses enter spray cabinet 10 and a rear wall 62 through which the hog carcasses 26 exit the spray cabinet 10. Preferably, the front wall 60 is closed by an entry door 64 and rear wall 62 is closed by an exit door 66. Entry and exit doors 64 and 66 are preferably of the type which are pushed open by the hog carcass 26 as it advances through the spray cabinet 10.

As illustrated in FIG. 2, the portion of front wall 60 is also provided with heat traces 44 in order to assist in preventing freezing of water within the spray cabinet. Although not showing in drawings, heat traces 44 are preferably also provided in the rear 62 of spray cabinet 10.

As shown in the drawings, the hog carcass 26 is suspended from an overhead conveyor 68, conveyor 68 including a rail 70 which extends through the upper portion of the interior chamber 24 of spray cabinet 10, thereby permitting the hog carcass to be advanced through the cabinet 10. The tops of the spray cabinet sidewalls 12 and 14 extend above rail 70 to a height sufficient to prevent excessive flow of super-cooled air into the interior chamber 24 of cabinet 10.

A preferred method for chilling hog carcasses is now described below with reference to the apparatus illustrated in the drawings and described above.

The method of the invention is described below in the context of a conventional "three stage" chilling process, which follows slaughter and initial processing of the carcass, and precedes final processing to produce a meat product.

Immediately following the slaughter of hog in the slaughter house, the carcass is conveyed along conveyor 68 to a preparation room for initial preparation prior to chilling. Initial preparation may preferably include washing the carcass with water, and cutting the carcass open as discussed above to remove body organs and expose the interior body cavity thereof. During initial preparation, the carcass is at a "kill temperature" which is between ambient room temperature and the body temperature of the animal prior to slaughter.

Following initial preparation, the carcass is rapidly chilled by the three stage chilling process referred to above. In the first stage of the process, the carcass is conveyed to a super-cooled environment inside a first refrigeration chamber. Preferably, the super-cooled environment provides aggressive cooling of the carcass 26 so as to rapidly reduce its temperature and prevent deterioration thereof. The temperature of the super-cooled environment in the refrigeration chamber is preferably from about −13 to about −30° C., and is more preferably from about −25 to about −30° C. The cooling medium in the refrigeration chamber comprises refrigerated air which is circulated at high velocity, preferably about 3,500 to about 4,000 feet per minute.

The conditions during the second stage of chilling are similar to those of the first stage, but are somewhat less severe. The second stage of the chilling process is preferably performed in a separate refrigeration chamber in which a super-cooled environment is maintained. For example, the temperature in the second refrigeration chamber may also be maintained in the range of from about −13 to about −30° C., and more preferably from about −25 to about −30° C. The air velocity in the second refrigeration chamber may, however, be somewhat lower than that in the first refrigeration chamber, and is preferably about 3,000 to about 3,500 feet per minute.

In the third stage of chilling, the carcass is transferred to a pre-exit room in which the temperature is maintained at slightly above 0° C. The carcass is stored in this room until the temperature throughout the entire carcass is equilibrated. During this stage, the ice shell provides a heat transfer medium to remove heat from the interior of the carcass and, as a consequence, is gradually melted. Preferably, the pre-exit room is maintained at a temperature of about +5° F. and refrigerated air is circulated therethrough at a rate of 2,900 feet per minute, thereby maintaining the carcass in a fresh, unfrozen state.

According to the preferred method of the present invention, the carcass is first chilled in a super-cooled environment until the outer surface of the carcass is cooled to a temperature at or near the freezing point of water, i.e. at or near 0° C. Preferably, cooling of the outer surface to about 0° C. is accomplished as quickly as possible, in order to minimize loss of moisture from the carcass. Typically, where the cooling conditions in the first refrigeration chamber are sufficiently aggressive, the outer surface of the carcass will reach this critical temperature during the first stage of cooling in the first refrigeration chamber, and preferably at a point which is relatively early in the first stage.

As soon as the outer surface of the carcass is cooled to about 0° C., water is sprayed onto the entire outer surface of the carcass in an amount sufficient to form a continuous layer of ice over the outer surface of the carcass. Preferably, the carcass is sprayed with water inside a spray cabinet 10 as described above.

The spray cabinet 10 is positioned along the conveyor 68 at a location which corresponds to the location at which the outer surface of the carcass will reach a temperature of about 0° C. Typically, the spray cabinet 10 will be located within the first refrigeration chamber such that the carcass is sprayed with water during the first stage of the chilling process.

When the water sprayed from the nozzles 30 inside the cabinet 10 contacts the outer surface of the carcass, a controlled, uniform shell of ice is quickly formed around the carcass. The carcass is sprayed with a sufficient amount of water such that the ice shell does not leave any exposed areas which would result in moisture loss prior to final processing of the carcass.

Although less preferred, it is possible that the carcass may pass through the first refrigeration chamber and into the second refrigeration chamber before the outer surface of the carcass will reach about 0° C. In this case, the spray cabinet is positioned within the second refrigeration chamber. However, this is less preferred because there will be significant moisture lost from the carcass as it passes through the first refrigeration chamber and part way through the second refrigeration chamber.

Following the formation of an ice shell on the carcass, chilling of the carcass is continued at a temperature at which the layer of ice is maintained, preferably for a time sufficient to cool the interior of the carcass to a temperature which deterioration is substantially prevented. For example, where the carcass is in the first refrigeration chamber during the ice formation step, chilling of the carcass is then continued through the remainder of the first refrigeration chamber and through the second refrigeration chamber in order to remove heat from the interior of the carcass.

Preferably, when the carcass exits the second refrigeration chamber, the interior of the carcass is at a temperature of about 33° F. to 37° F., this temperature being sufficient to prevent deterioration of the carcass.

The next stage of the chilling process is the third stage, also referred to as the "equilibration" stage, during which the temperature throughout the carcass is equilibrated to a temperature at which deterioration is prevented, and which is greater than 0° C. such that the carcass is maintained in a fresh, unfrozen state.

While the preferred method of the invention has been described with reference to a process utilizing only one spray cabinet 10 according to the invention, it will be appreciated that more than one spray cabinet can be positioned at spaced intervals along the conveyor where it is desired to further thicken the ice layer on the carcass.

The preferred method of the present invention as described above is capable of reducing moisture loss to less than one percent, and preferably close to zero percent, thereby providing a significant improvement over the prior art discussed above. In addition to reduced moisture loss, and as a consequence thereof, the meat products produced by the method of the invention have reduced cell damage, improved color index, less two-toning and a firm meat quality.

Although the preferred embodiments of the invention have described a method in which water is sprayed onto the carcass to form an ice shell, it will be appreciated that other liquids may be used to equal advantage. Preferably, such liquids have a freezing point close to that of the freezing point of water.

It will also be appreciated that the water sprayed onto the carcass may contain additives. For example, chlorine or other anti-bacterial agents may be added to the water in order to prevent growth of bacteria on the carcass.

Although the invention has been described in connection with certain preferred embodiments, it is not intended to be limited thereto. Rather, the invention includes all embodiments which may fall within the scope of the following claims.

What is claimed is:

1. A method for chilling an animal carcass from a kill temperature to a temperature at which deterioration of the carcass is substantially prevented, said carcass having an outer surface and an interior, said method comprising:
   (a) chilling the carcass until the outer surface of the carcass is cooled to a temperature at or near the freezing point of water;
   (b) after step (a), and while the outer surface of the carcass is at or near the freezing point of water, spraying water onto substantially the entire outer surface of the carcass in an amount sufficient to form a continuous layer of ice over the outer surface;
   (c) continuing to chill the carcass at a temperature at which the layer of ice is maintained, for a time sufficient to cool the interior of the carcass to said temperature at which deterioration is substantially prevented.

2. The method according to claim 1, wherein during step (a) the carcass is chilled in an environment having a temperature of from about −15° C. to about −30° C.

3. The method according to claim 1, wherein said temperature at which deterioration is substantially prevented is above the freezing point of water, such that the carcass is maintained in a fresh, unfrozen state.

4. The method according to claim 3, wherein said temperature at which deterioration is substantially prevented is from about 33° F. to about 37° F.

5. The method according to claim 3, further comprising an equilibration step after step (c) in which the temperature is maintained above the freezing point of water for a sufficient time to melt the layer of ice and permit the temperature of the interior and the outer surface of the carcass to equilibrate to said temperature at which deterioration is substantially prevented.

6. The method according to claim 1, wherein said temperature of step (c) at which the layer of ice is maintained is from about −15° C. to about −30° C.

7. A method for chilling an animal carcass from a kill temperature to a temperature at which deterioration of the carcass is substantially prevented, said carcass having an outer surface and an interior, said method comprising:
   (a) chilling the carcass until the outer surface of the carcass is cooled to a temperature at or near the freezing point of water;
   (b) after step (a), spraying water onto substantially the entire outer surface of the carcass in an amount sufficient to form a continuous layer of ice over the outer surface;
   (c) continuing to chill the carcass at a temperature at which the layer of ice is maintained, for a time sufficient to cool the interior of the carcass to said temperature at which deterioration is substantially prevented;
   wherein the carcass is cooled by air in step (a), said air being circulated by one or more blowers.

8. A method for chilling an animal carcass from a kill temperature to a temperature at which deterioration of the carcass is substantially prevented, said carcass having an outer surface and an interior, said method comprising:
   (a) chilling the carcass until the outer surface of the carcass is cooled to a temperature at or near the freezing point of water;
   (b) after step (a), spraying water onto substantially the entire outer surface of the carcass in an amount sufficient to form a continuous layer of ice over the outer surface;
   (c) continuing to chill the carcass at a temperature at which the layer of ice is maintained, for a time sufficient to cool the interior of the carcass to said temperature at which deterioration is substantially prevented;
   wherein each of steps (a) and (c) is conducted in a refrigeration chamber.

9. The method according to claim 8, wherein step (b) is conducted in a spray cabinet located within said refrigeration chamber of step (a) or said refrigeration chamber of step (c).

10. The spray cabinet according to claim 9, wherein each of said side walls comprises a pair of panels spaced from one another to define an interior panel space, said interior panel space being insulated.

11. A spray cabinet for use in forming a layer of ice on a carcass during cooling of said carcass from a kill temperature to a temperature at which deterioration of the carcass is substantially prevented, said cooling being performed within a refrigeration chamber, through which said carcass is transported by suspension from an overhead conveyor, said cabinet comprising:
   (a) a pair of side walls defining an elongate interior chamber, each of said side walls having an inner surface and an outer surface, said chamber having a width defined by a distance between the inner surfaces of the side walls which is slightly greater than a width of said carcass so as to closely enclose said carcass, and having a height greater than a length of said carcass;
   (b) water supply means for supplying water to said spray cabinet;
   (c) spray means in communication with said water supply means, said spray means comprising a plurality of nozzles located on the inner surface of each of the side walls, said nozzles being positioned and directed so as to ensure that water sprayed by the nozzles contacts substantially an entire outer surface of the carcass as it passes through the spray cabinet; and
   (d) heating means to prevent freezing of the water inside the spray means;
   wherein said interior panel space also contains said heating means, and wherein said heating means comprises electrical resistance heating means.

12. The spray cabinet according to claim 11, wherein a bottom of the interior chamber of the spray cabinet is provided with water drainage means.

13. The spray cabinet according to claim 12, wherein said water drainage means comprises a trough extending along said side walls.

14. The spray cabinet according to claim 11, further provided with front and rear walls provided with entry and exit doors through which the carcass enters and exits the spray cabinet.

15. The spray cabinet according to claim 11, wherein said conveyor extends through an upper portion of said chamber substantially parallel to said side walls.

* * * * *